United States Patent [19]

Pietsch et al.

[11] Patent Number: 5,011,634

[45] Date of Patent: * Apr. 30, 1991

[54] MICROCAPSULES AND MICROCAPSULE PRODUCTION PROCESS

[75] Inventors: Gunter Pietsch, Isernhagen; Karl-Heinz Schrader, Hanover, both of Fed. Rep. of Germany

[73] Assignee: Papierfabrik August Koehler AG, Oberkirch, Fed. Rep. of Germany

[*] Notice: The portion of the term of this patent subsequent to Apr. 25, 2006 has been disclaimed.

[21] Appl. No.: 285,506

[22] Filed: Dec. 16, 1988

Related U.S. Application Data

[63] Continuation-in-part of Ser. No. 169,630, Mar. 18, 1988, Pat. No. 4,965,025, which is a continuation-in-part of Ser. No. 922,591, Oct. 24, 1986, Pat. No. 4,824,823.

[30] Foreign Application Priority Data

Dec. 21, 1987 [DE] Fed. Rep. of Germany ....... 3743427
Jun. 1, 1988 [DE] Fed. Rep. of Germany ....... 3818712

[51] Int. Cl.[5] .............................................. B01J 13/16
[52] U.S. Cl. ................................ 264/47; 428/402.21; 503/215
[58] Field of Search ........................... 264/4.1, 4.7; 428/402.21; 503/215

[56] References Cited

U.S. PATENT DOCUMENTS

| | | | |
|---|---|---|---|
| 3,594,328 | 7/1971 | Schibler et al. | 264/4.7 X |
| 3,607,775 | 9/1971 | Yoshida et al. | 264/4.7 X |
| 3,778,383 | 12/1973 | Schibler et al. | 264/4.7 X |
| 4,328,119 | 5/1982 | Iwasaki et al. | 264/4.7 |
| 4,396,670 | 8/1983 | Sinclair | 264/4.7 X |
| 4,406,816 | 9/1983 | Sliwka | 264/4.7 X |
| 4,824,823 | 4/1989 | Pietsch et al. | 264/4.7 X |
| 4,965,025 | 10/1990 | Pietsch et al. | 264/4.7 |

FOREIGN PATENT DOCUMENTS

3532878A1 3/1987 Fed. Rep. of Germany .
1389238 4/1975 United Kingdom .

*Primary Examiner*—Richard D. Lovering
*Assistant Examiner*—John M. Covert
*Attorney, Agent, or Firm*—Darby & Darby

[57] ABSTRACT

The invention relates to a process for producing microcapsules by microencapsulating hydrophobic oils, particularly with substances contained therein, in which the hydrophobic oil is mixed, accompanied by vigorous stirring, into an aqueous medium containing a dispersion-stabilizing compound. The resulting oil-in-water dispersion is acid adjusted, aminoplastic capsules are formed in the conventional manner and the aqueous fraction of the aqueous medium is removed in the usual way. The aqueous medium contains a water-soluble, cationic compound such that it forms a dispersion-stabilizing compound in interaction with the water-soluble, anionic, sulphonated melamine-formaldehyde precondensate. The microcapsules obtained according to this process can be obtained economically without agglomerate formation in the form of dry single capsules e.g. by spray drying the aqueous capsule dispersion obtained. The invention also permits the encapsulation of random substances in dissolved and/or finely dispersed form.

37 Claims, 2 Drawing Sheets

MICROCAPSULES AND MICROCAPSULE PRODUCTION PROCESS

This application is a continuation-in-part of copending application Ser. No. 169,630, filed Mar. 18, 1988, now U.S. Pat. No. 4,965,025 which in turn is a continuation-in-part of Ser. No. 922,591, filed Oct. 24, 1986, now U.S. Pat. No. 4,824,823.

This invention relates to a process for the production of microcapsules by microencapsulating hydrophobic oils, particularly with substances contained therein, the hydrophobic oil being mixed, accompanied by vigorous stirring, into an aqueous medium containing a dispersion-stabilizing compound. The oil-in-water dispersion thus obtained is acid adjusted and aminoplastic capsules are thereafter formed in the conventional manner, optionally removing the aqueous fraction of the aqueous medium in the conventional way.

BACKGROUND OF THE INVENTION

Numerous processes are known for the microencapsulation of hydrophobic oils, particularly with the colour couplers of reaction carbon systems dissolved therein. The microcapsules which can be produced therewith, and which as a rule contain an oily, hydrophobic solution of the colour coupler, are conventionally applied to the underside of a paper sheet, the so-called CB-sheet (coated back). The CB-sheet can be in contact with a so-called CF-sheet (coated front), in which the surface facing the CB-sheet is coated with an acid reactant for the colour coupler. The acid reactant can e.g. be an acid-treated clay, such as montmorillonite clay, or a low molecular weight phenolic resin, such as a phenol-formaldehyde novolak resin. If the acid reactant is an acid compound which is soluble in hydrophobic oils, then it can also be encapsulated. During the printing process, said capsules are shattered by the printing type. Thus, the reactants come into contact with one another and supply a coloured mark or symbol on the CF-sheet. The two colour reactants can be applied to the surface on a single sheet, so as to obtain a so-called autogenous system (SC-sheet self contained). It is recommended to encapsulate both reactants, if the acid reactant is soluble in the oil, so as to exclude an undesired premature reaction of the reactants.

Numerous encapsulation processes exist for the production of microcapsule shells for the microcapsules used in colour reaction systems. These are e.g. based on the use of gelatin coacervate, polyisocyanate, polyamide or aminoplastic systems. The present invention is based on an aminoplastic system, in which e.g. a water-soluble, nonionic melamineformaldehyde precondensate is condensed by acid catalysis, accompanied by the formation of the microcapsule shell. Increasing significance has been attached to this process of late. It can be relatively easily controlled and takes place under comparatively gentle reaction conditions, so that even very sensitive colour couplers remain unimpaired during the reaction.

Commonly owned German patent 35 45 803, which corresponds to U.S. Pat. No. 4,824,823, provides a detailed description of a process for, the production of microcapsules leading to a particularly stable oil-in-water dispersion, in that the aqueous solution of a cationic melamine-formaldehyde precondensate and that of a water-soluble organic polymer are mixed under vigorous stirring with a high power dispersing apparatus (e.g. based on the rotor/stator principle) for obtaining optimum turbulence and for excluding disturbing, laminar conditions. As a result, the originally dissolved, cationized melamine-formaldehyde precondensate is separated as a very fine suspension in the presence of the aqueous solution of a water-soluble polymer. These very finely suspended particles lead to a particularly favorable stabilization of the oil-in-water dispersion, in which the microcapsule shell is mainly formed by the condensation of the water-soluble, nonionic melamine-formaldehyde precondensate, water-soluble organic polymers with functional groups of the type described in German patent 35 45 803 have long been known. They include the particular polymers carrying acid, amide, amino, imino, ester, ether, hydroxyl, urethane, thiol or mercaptan groups. Preferred examples for such polymers are polyvinyl alcohol, gelatin and maleic anhydride copolymers, particularly ethylene/maleic anhydride copolymers or styrene/maleic anhydride copolymers, starch, cellulose derivatives, such as carboxymethyl cellulose (CMC) or hydroxyethyl cellulose (HEC), alginates, such as sodium alginate, polyurethanes or polyethylene oxide. It is possible to use with particular advantage in this process as the water-soluble organic polymer, acrylamide/acrylic acid copolymer.

European patent 0 026 914 describes the use of sulphonated polymers in a microencapsulation system. However, unlike the present polymers, these known sulphonated polymers are characterized in that they are homopolymers or copolymers carrying sulphonic acid groups, which are free from phenyl and/or sulphophenyl groups. Typical representatives of said polymer group are polysulphoethyl(meth)-acrylate, polylsulphopropyl(meth)-acrylate, polymaleinimide-N-ethane sulphonic acid and poly-2-acrylamido-2-methyl-propane sulphonic acid.

None of the known processes requiring a film-forming, water-soluble polymer can guarantee the production of single capsules by conventional spray drying. In fact the excess polymer fraction leads to the regular formation of agglomerates, which reduce the typing quality of reaction carbon papers if, by redispersion, the spray-dried capsules are to be incorporated into non-aqueous printable media. The quantity of the material to be encapsulated in the form of e.g. colour reactants cannot be undesirably increased, because this leads to such a viscosity increase that it is not possible to perform the process.

Single capsules produced according to the aforementioned known process (U.S. Pat. No. 4,824,823), and free from the aqueous fraction, are suitable for printable media, for use e.g. in flexographic, screen, wet and dry offset and intaglio printing, and particularly for segmental printing. However, the typing quality of the carbon papers obtained may be unsatisfactory due to a high proportion of agglomerated microcapsules.

Thus, an object of the invention was to further develop the aforementioned process, so that it is possible to stabilize the oil-in-water dispersion without a film-forming, water-soluble polymer; increase the proportion of the substance to be encapsulated without simultaneously increasing the viscosity of the dispersion to a technically unacceptable level; and to provide substantially single capsules redispersable in largely non-aqueous media. According to the invention, these problems are solved if the aqueous medium contains a water-soluble, anionic, sulphonated melamine-formaldehyde precondensate, as well as a water-soluble, cationic com- pound, which forms a dispersion-stabilizing compound with said water-soluble, anionic, sulphonated melamine-formaldehyde precondensate.

SUMMARY OF THE INVENTION

The inventive process uses a water-soluble, anionic, sulphonated melamine-formaldehyde precondensate in conjunction with such a cationic reactant that, in interaction with said specific melamine-formaldehyde precondensate, an emulsifying or dispersing-stabilizing action is obtained. The expert can find the most suitable cationized reactants by a few small-scale experiments.

Water-soluble, anionic, sulphonated melamine-formaldehyde precondensates are known. See, e.g., "Zement Kalk Gips", Bauverlag, Wiesbaden, vol. 21, 1968, No. 10, pp. 415–419, which describes a liquefying agent for cement mortar and gypsum. Such materials have not as yet been used for producing microcapsules.

This melamine-formaldehyde precondensate can be optimized for this invention in the following way. Per melamine ring, it preferably contains on average approximately 0.7 to 1.3 sulphonate groups, particularly 0.9 to 1.1 sulphonate groups. Preferably the melamine ring contains on average approximately 2 to 4 methylol groups, particularly approximately 2.5 to 3.5 methylol groups. The molecular weight of said melamine-formaldehyde precondensate is preferably approximately 3,000 to 300,000 and especially approximately 5,000 to 100,000. In the ideal case, the water-soluble, anionic, sulphonated melamine-formaldehyde precondensate would have the following structure:

in which n is preferably an integer between approximately 8 and 1,000, particularly approximately 15 to 350. No particular significance is attached to the sodium ion in this formula. It can in fact be replaced by other metal ions, which ensure the water-solubility of said precondensate. Preferably the water-soluble, anionic, sulphonated melamine-formaldehyde precondensate is contained in the aqueous phase in a quantity of approximately 0.3 to 25% by weight. There are preferably approximately 0.01 to 10 parts by weight of interacting cationic compound, particularly approximately 0.02 to 5 parts by weight and more especially approximately 0.1 to 1 part by weight for 1 part by weight of water-soluble, anionic, sulphonated melamine-formaldehyde precondensate.

The presently selected term "interacting cationic compound" (or "interacting reactant") covers numerous compounds, such as e.g. cationic polyethylene imines, polyamidoamines, polyether amines, polyamidamineepichlorohydrins, dicyanamide-formaldehyde complexes, modified alkylaryl polyglycol ether, fatty acid amide condensation products, amineamide formaldehyde condensation products, dicyandiamide derivatives, imidazoline derivatives, aminocarboxylates, quaternary ester ammonium compounds and cationized melamine-formaldehyde precondensates and other cationized aminoplastic forming agents, such as aldehyde precondensates based on urea, thiourea, N-alkyl urea, guandine, guanamine derivatives, guanamide and alkyl/aryl sulphonamides.

With particular advantage, the interacting reactant is constituted by cationized melamine-formaldehyde precondensates. The product commercially available under the name Resin 4205$^R$ (marketed by CECA Klebstoff GmbH & co. KG, Offenbach, German Federal Republic) is particularly suitable. It is a cationizable melamine-formaldehyde precondensate, which is insoluble in water in the neutral pH-range and above, particularly at a pH-value of approximately 5 and above, so that it can be readily referred to as "water-insoluble". The term "water-insoluble" is adequate for the expert for the practical realization of the present invention. The same or comparable terms are used in the relevant chemical reference works, e.g. not only "water-insoluble", but also "slightly water-soluble" and the like, as can e.g. be gathered from D'Ans Lax "Taschenbuch fur Chemiker and Physiker", vol. II, Organic Compounds, 1964, pp. 2–57. From the specific chemical structural standpoint, the above commercial product can be described as follows. It is a mixture, in the form of a powder, of oligomeric, non-modified melamine-formaldehyde precondensates, which mainly consist of 2 to 4 melamine rings, in which the melamine rings are interconnected by condensing methylol groups, mainly via $-CH_2-O-CH_2-$groups, there being 3 to 5 unmodified methylol groups per melamine ring. Preferably the cationized melamine-formaldehyde precondensate comprises an oligomer with 2 to 6 triazine rings, which contains 2.5 to 5 methylol groups per triazine ring and is free from methylol ether groups.

In order to dissolve the water-insoluble, cationizable melamine-formaldehyde precondensate to be used for the purposes of the invention and thereby transfer it into its cationized or protonized, soluble form, it is preferably introduced into a relatively strong acid solution, such as into an aqueous solution with a pH-value of approximately 3.5 or less. At this pH-value its solution is stable for a long time. If the pH-value is raised to approximately 3.5 to 4.5, then the stability decreases, probably because the electrostatic, reciprocal repulsion of the molecules is increasingly removed by the removal of protons. If the pH-value is raised to approximately 4.5, particularly approximately 5.0 and more, this leads to a substantially quantitative precipitation of the water-insoluble (cationizable) melamine-formaldehyde precondensate.

It has surprisingly been found in the case of the water-insoluble, cationizable melamine-formaldehyde precondensate that, contrary to expectations, it is not precipitated under the described precipitation conditions. Instead, the addition of a water-soluble, anionic, sulphonated melamine-formaldehyde precondensate results in a complex interaction which prevents precipitation. On checking the reaction medium with extreme centrifuging, no sediments occur. The reaction medium can also be filtered so as to leave no residues with extremely fine-porous filter materials, such as e.g. a blue band filter. This applies in a wide pH-range and therefore also in a pH-range where the cationizable melamine-formaldehyde precondensate would normally precipitate.

When using extremely unfavorable concentration and/or pH-conditions, it is still possible for turbidity phenomena to occur, but they have no influence on the emulsion or dispersion stabilization.

On modifying the proportions by increasing the quantity of the described cationized melamine-formaldehyde precondensate or on working in a higher pH-range, there can be a precipitation of a solid, but this does not have negative effect on the dispersion stabilization. Much the same applies for other cationized compounds, as given hereinbefore in the substance classes.

The concentration of the cationized melamine-formaldehyde precondensate in aqueous solution is, for most commercial products, generally in the range approximately 9 to 12% by weight, preference being given to a value of approximately 10% by weight. As stated, its pH-value is preferably approximately 1.5 to 3.0, the acidity being adjusted, as a function of the intended use, by using e.g. hydrochloric, phosphoric or formic acid.

The essence of the invention is not the way in which the aminoplastic capsule walls themselves are formed, this being a question of standard methods. For example, the aminoplastics can consist of aldehyde condensates based on melamine, urea, thiourea, N-alkyl urea, guandine, acetoguanamine, benzo-guanamine, caprinoguanamine, cyanamide, dicyandiamide and alkyl/aryl sulphonamide. The preferred aldehyde is formaldehyde, but higher aldehydes can also be used. For the formation of the aminoplastic capsules, use is preferably made of a water-soluble, nonionic melamine-formaldehyde precondensate, which is in particular a melamine-formaldehyde precondensate partly etherified with methanol. Urea-formaldehyde precondensates, a mixture of melamine-formaldehyde precondensates and urea-formaldehyde precondensates can be used in a similarly advantageous manner for forming the aminoplastic capsules.

It has been found that nonionic melamine-formaldehyde precondensates are particularly suitable for forming the aminoplastic capsule shell. Various requirements must be made thereon. It must firstly be water-soluble, whilst also preferably having a reduced self-reactivity. The reactivity reduction can be achieved through an at least partial blocking of the active methylol groups, for which suitable processes are known (cf. "Kunststoffhandbuch", vol. X, Duroplaste, p. 173). Thus, the desired reactivity of the nonionic, oligomeric melamine-formaldehyde precondensate can be adjusted by partial methylation. European patent 0 026 914 describes a product which e.g. per mole of melamine, contains 5.25 mole of formaldehyde and 2.3 mole of methyl ether groups. These requirements are satisfied by the commercial products Madurit MW 112$^R$ of Cassella AG (cf. "Kunstharze Hoechst, Technisches Merkblatt", September 1982 edition), BC 336$^R$ of BIP Chemicals Limited and Resin 42–91$^R$ of Rousselot GmbH.

Through reducing the reactivity of the nonionic melamine-formaldehyde precondensate, it is ensured that the encapsulation process does not take place too rapidly. This represses an undesired agglomerate formation or the flocculation of larger particles. Agglomerates or larger particles of e.g. microcapsules with encapsulated colour reactants of colour reaction systems in reaction carbon papers e.g. lead to an unclear character formation. Nonionic, methylated melamine-formaldehyde precondensates of the indicated degree of methylation generally have the desired reactivity and are therefore preferred within the scope of the present invention. For the purposes of the present invention, it is also possible to use mixtures of different reactive, nonionic melamine-formaldehyde precondensates. In certain cases it can be advantageous to control the reactivity of the available nonionic melamine-formaldehyde precondensate, e.g. by adding formaldehyde.

The concentration of the aqueous solution of the nonionic melamine-formaldehyde precondensate can fluctuate within wide limits and is preferably approximately 7 to 20% by weight, particularly approximately 12% by weight.

The expert is aware of the fact that the characteristics of the aminoplastic capsule shell can on the one hand be influenced by the starting substance in the form of water-soluble aldehyde precondensate or in the form of mixtures of chemically differing precondensates (cf. the above list) and on the other hand by the way in which the process is performed or the condensation is controlled. The literature refers to the control parameters of aminoplastic condensation, such as the pH-value, the acid type, the temperature and the concentration of the reaction resins or the further components of the reaction medium.

The hydrophobic oil in which is dissolved e.g. the colour coupler of colour reaction systems or its acid reactant, provided that it is a soluble compound (e.g. a phenolic compound), is inert with respect to water, i.e. it is substantially insoluble and therefore immiscible in water. A low solubility can be ignored. Preferred examples of oils, which can be inventively used as solvents or dispersants of the substance to be encapsulated, are in particular partly hydrogenated terphenyls, chlorinated paraffins, alkylated biphenyls, alkyl naphthalenes, diaryl methane derivatives, dibenzyl benzene derivatives, alkanes, cycloalkanes and esters, such as phthalates, adipates, trimellitates and phosphates, and silicone oils.

The inventive process makes it possible to encapsulate very varied substances, no matter whether they are dissolved or dispersed, i.e. emulsified, very finely suspended and/or colloidally dispersed or dissolved in the aforementioned hydrophobic oil. These can in particular be colour reactants, particularly colour couplers of colour reaction systems, such as perfumes and aromatizing agents, flavoring agents, vitamins, fertilizers, biocides, in particular fungicides, pesticides, herbicides and insecticides, insect attractants, plant protection agents, cleaning agents, solvents, lubricants, luminous paints, liquid crystals, adhesives for single or multi-component systems, paint pigment dispersions and magnetic pigment dispersions in oil or wax carrier materials.

The present invention is particularly important in connection with the microencapsulation of hydrophobic oils with colour reactants, particularly colour couplers of colour reaction systems dissolved or dispersed therein. It is possible to use for dissolving or dispersing in the hydrophobic oils numerous different colour couplers, which are described in detail in the literature. Examples are lactone, phthalide, fluoran, diphenylamine, spiropyran, auramine, phenothiazine, amino-phenyl pyridine and aminodiazaxanthene lactone derivatives. Detailed reference is made hereinafter to this particular use of the present invention. However, it is expressly pointed out that the following statements correspondingly apply in connection with the encapsulation of random suitable substances. Thus, in such cases the term "colour coupler" could be replaced by "substance". It is also possible to completely omit the term "colour coupler" and to relate the described procedures solely to the encapsulation of a specific hydrophobic oil, e.g. an oily liquid crystal. Thus, the following description simultaneously serves as a disclosure in connection with the encapsulation of random suitable substances.

The weight ratios used for the two interacting reactants, i.e. the cationized compound on the one hand and the water-soluble, anionic, sulphonated melamine-formaldehyde precondensate on the other, are not critical. These ratios can undergo wide variations as a function of the molecular weight and the positive charge size of the cationic product. The expert can readily determine the optimum ratios as a function of the nature of the materials used and their concentration in the particular aqueous medium by using a few suitable preliminary tests. Preferably the sulphonated melamine-formaldehyde precondensate is in a clear excess compared with the interacting, cationized reactant. Preferably for approximately 1 part by weight of water-soluble, anionic, sulphonated melamine-formaldehyde precondensate there are approximately 0.02 to 5 and particularly approximately 0.05 to 1.5 parts by weight of interacting reactant.

DETAILED DESCRIPTION OF THE INVENTION

Preferably, the following procedure is used when performing the inventive process and using the aforementioned starting materials. An approximately 1 to 25, preferably approximately 4 to 10% by weight aqueous solution of the water-soluble, anionic, sulphonated melamine-formaldehyde precondensate is provided in such a quantity with a cationized or cationizable, per se water-insoluble melamine-formaldehyde precondensate (dissolved in an aqueous medium with a pH-value of approximately 2.5) that the concentration of the latter compound is approximately 0.3 to 3% by weight. The pH-value of the resulting solution is then approximately 4.5 to 5.5. Subsequently the material to be encapsulated, or the hydrophobic oil in which the colour reactant is dissolved, is stirred into said aqueous solution, accompanied by vigorous stirring and using a high power dispersing apparatus. The apparatus can be of the type described e.g. in German patent 35 45 803 (U.S. Pat. No. 4,824,823).

The oil droplet diameter in the oil-in-water dispersion is between approximately 2 and 10, preferably between approximately 4 and 5 micrometers. This diameter favors a uniform behavior of the color reaction systems, particularly the color reaction typing papers produced by means of the microcapsules obtained. If capsules are produced for other than color reaction paper uses, the capsule diameter can also be considerably larger and extend up to a few hundred micrometers. In each case, the selected ratio of the oil phase to the solids fraction of the aqueous phase is not critical. In the case of colour reaction paper capsules, said weight ratio is between approximately 2:1 and 9:1, particularly between approximately 4:1 and 5:1. In the case of capsules for other uses, the weight ratios can vary considerably in accordance with the particular requirements.

Before or after the admixing of the oil phase, the mixture or oil-in-water dispersion is acid adjusted in view of the condensation reaction taking place during the subsequent formation of the capsule shell and which is catalyzed by acids. It is possible to use organic or inorganic acids, provided that they have an adequate acidity and do not give rise to disturbing secondary effects, and particularly have no disadvantageous influence on the colour couplers dissolved in the hydrophobic oil. Preference is given to the use of acetic, formic, citric, hydrochloric and sulphuric acids. The optimum pH-value for the condensation reaction is generally in the weak acid range, particularly between approximately 3 and 6. Preference is given to the range of approximately 3.5 to 5. Excessively high H-values increase the reaction time, whilst too low pH-values are to be avoided, because they can lead e.g. to an undesired premature discoloration of the colour coupler in the microcapsule.

Into the mixture prepared in the above way is e.g. stirred the aqueous solution of the nonionic melamine-formaldehyde precondensate, which subsequently forms the capsule shell. It is possible to use conventional, known stirring means for this purpose, which do not lead to any particular stirring or turbulence effects. The aforementioned high power dispersing means must not be used, because it would be prejudicial to the formation of the capsule shell through the condensation reaction of the nonionic melamine-formaldehyde precondensate, optionally whilst incorporating a water-soluble, macromolecular substance. The above-described starting materials are then in the form of a reactive oil-in-water dispersion or emulsion in which the formation of the capsule shell of the microcapsules takes place under normal stirring for approximately 1 to 5 hours, particularly approximately 2 to 3 hours. This dispersion is completely stable, which can be attributed to the described interaction of water-soluble, anionic, sulphonated melamine-formaldehyde precondensate and cationic reactant.

Since the aforementioned condensation reactions leading to the formation of the microcapsule wall take place in an accelerated manner when heat is supplied, it can be desirable to regulate or control the temperature of the individual process stages, e.g. by heating. Following the formation of the reaction medium, the temperature is generally initially raised to approximately 55° C., in order to optimize the condensation reaction and therefore the formation of the wall of the microcapsules. This process is regularly roughly terminated after 2 hours reaction at approximately 55° C., in the case of the aforementioned preferred pH-value ranges. With a temperature of less than 55° C., microcapsules of a generally satisfactory quality are still obtained, but, as stated, a longer reaction time is necessary. It is also possible to work at temperatures which are above roughly 55° C. Within the framework of simple routine tests, it is possible to determine without difficulty the particularly favorable reaction temperature for the individual case.

It is also possible to add to the reaction medium various additives, such as an ammonium salt, e.g. ammonium chloride, which in some cases speeds up the condensation reaction.

If the condensation reaction has taken place to the desired extent, the pH-value is set neutral or slightly alkaline by adding alkalis, particularly sodium hydroxide, potassium hydroxide or ammonium hydroxide. This substantially prevents further reaction which, during the storage of the microcapsules, could lead to agglomerate formation. The corrosive influence of the acid medium on the metal reaction vessels is also removed. When using ammonium hydroxide any free formaldehyde present is largely removed from the reaction system as an odorless addition compound.

The inventive process can be performed batchwise, but also continuously. In the case of the continuous procedure, the aqueous solution obtained at the start of the process (and which contains the stabilizing, interacting reactants) is e.g. mixed directly following its preparation, by means of a high power dispersing apparatus, with the oil phase containing the colour reactants, and is then passed into a stirred vessel cascade, in which the condensation reaction takes place. In the first stirred vessel, the aqueous solution of the nonionic melamine-formaldehyde precondensate is dosed in. In practice it is appropriate to firstly introduce the reaction mixture into a larger stirred vessel. As soon as this vessel is filled, the fresh reaction medium is transferred into the second stirred vessel, whilst the reaction in the first vessel is concluded. The finished capsule dispersion is removed. It is then possible to supply fresh reaction medium, whilst the capsule formation reaction takes place in the second stirred vessel. This continuous process is only given as an example and can undergo numerous modifications.

Following the formation of the finished aqueous capsule dispersion, it can be subjected to standard processes for removing the aqueous fraction. This can e.g. be brought about in that the aqueous capsule dispersion is filtered or centrifuged, or the aqueous fraction is evaporated or spray-dried. Spray-drying is a particularly suitable process and is e.g. described in Rompps Chemie-Lexikon, seventh edition, vol. 6, 1977, pp. 3693-3694. The desired single capsules are obtained in each case. It is also possible to initially transfer the aqueous dispersion into another anhydrous medium and to remove the aqueous fraction therefrom, so that the individual capsules are present in dispersed form in the new medium. An example of such a process is the flushing process, which is e.g. described in Rompps Chemie-Lexikon, eight edition, vol. 2, 1981, pp. 1346-1347.

In all cases, and independent of the nature of the separation of the aqueous fraction, according to the invention (and other than in the previously described prior art), single capsules with the associated advantages are obtained. This can be proved by means of a conventional particle size determination process, e.g. the laser diffraction process.

Figure 1A:
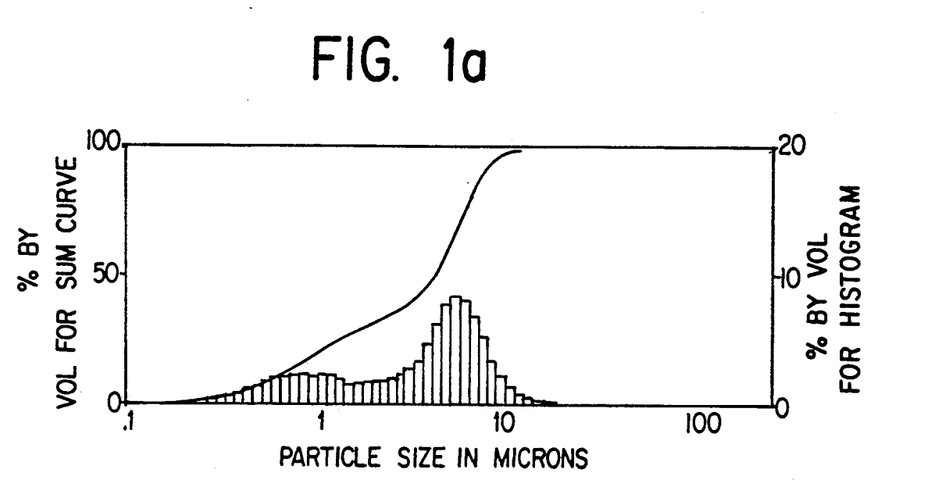
Figure 1B:
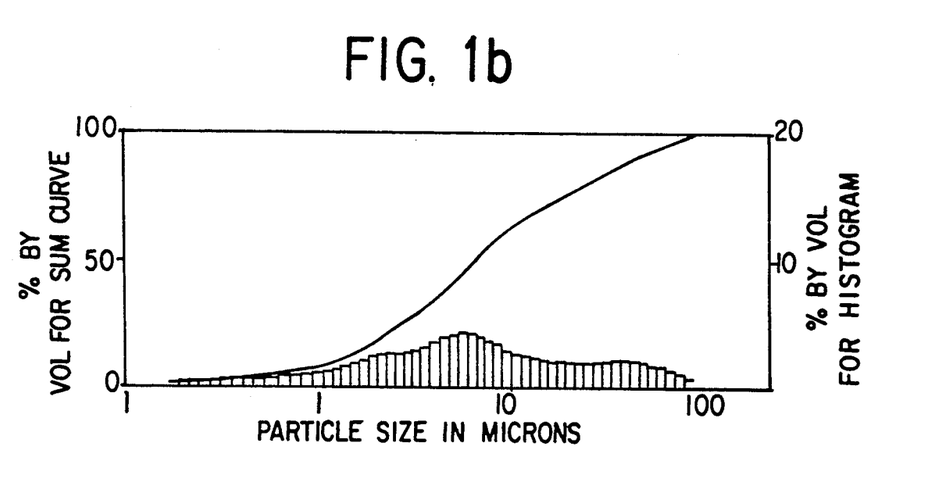

A commercially available, aqueous aminoplastic capsule dispersion admittedly shows, as is apparent from FIG. 1a, a usable particle size distribution of the microcapsules. However, on redispersing the microcapsules obtained by spray drying from said commercial aqueous dispersion in an anhydrous or limited water-containing solvent system, there is a clear displacement towards a larger particle diameter, which indicates marked agglomeration (cf. FIG. 1b). These characteristics of spray-dried microcapsule powders redispersed in substantially non-aqueous solvent systems are typical of microcapsules produced as an aqueous dispersion according to the prior art.

When printing for the production of colour reaction carbon papers, such agglomerates lead to a lower typing quality. The use of the aqueous single capsule dispersion of known commercial products in connection with segmental spot printing processes suffers from the disadvantage that, despite the acceptable particle size distribution, on printing the paper web is subject to undesired swelling.

Figure 2A:
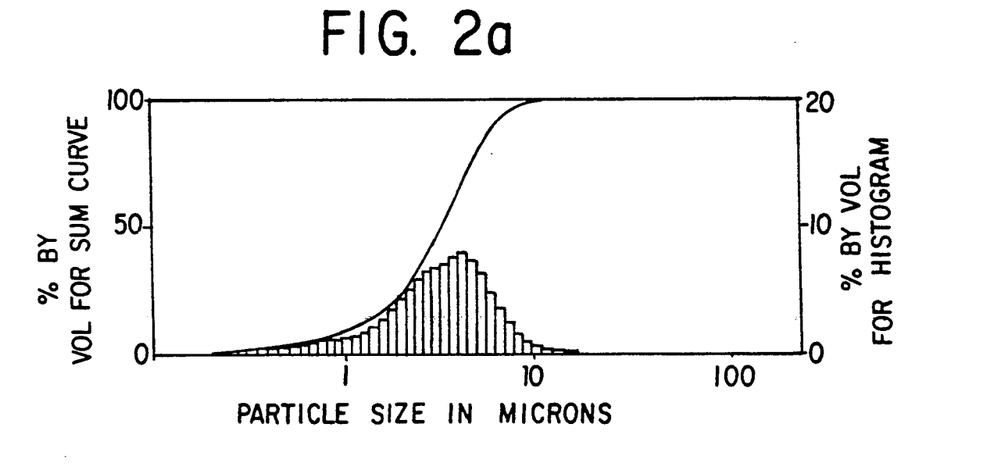
Figure 2B:
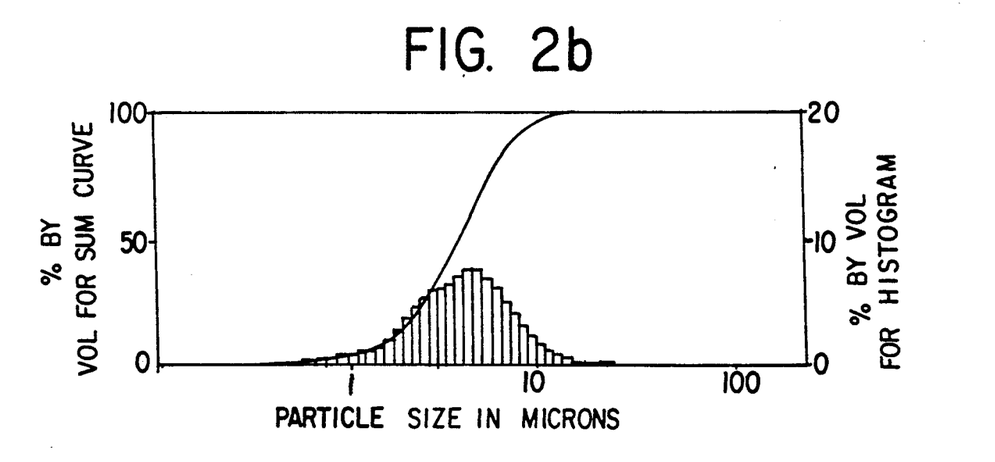

FIGS. 2a and 2b show the above-mentioned measurements for determining the capsule diameter distribution curve, on the basis of the aqueous dispersion obtained according to the inventive process, and also with the single capsules obtained after separating the aqueous fraction. These curves can be substantially superimposed. Thus, the microcapsules obtainable according to the inventive process are shown as being redispersible as single capsules. This redispersibility can also take place in non-aqueous printing inks, so that said disadvantageous swelling of the printing paper no longer occurs.

The fact that when using the single capsules according to the invention the typing quality is improved using printing inks can be shown in the following way. The commercially available aminoplastic microcapsule powder and the single capsules inventively obtained according to example 1 were introduced into a printing ink comprising 30% by weight capsule powder, 12% by weight polyvinyl pyrrolidone and 58% by weight ethanol. Using a flexographic printing press, said printing ink was printed on a commercial body paper weighing 52 g/m$^2$, the printing ink application obtained being 3.9 g/m$^2$. A visually or microscopically performed type sharpness comparison led in the case of the commercially available capsule powder to an unsharp, rastered script, whereas the inventive capsules have a sharp, cohesive set of characters. A similar result as regards the sharpness of the script was obtained with hot melt printing inks based on wax and which, apart from 45% by weight capsule powder, contained 28% by weight paraffin wax and 27% by weight carnauba wax, and which were printed as a 4.1 g/m$^2$ application on the body paper described above, using a hot carbon machine.

Technologically, and without being bound by a particular theory, the present invention can be explained in the following way. Through the interaction of the water-soluble, anionic, sulphonated melamine-formaldehyde precondensate and the cationic reactant, particularly in the form of the cationizable melamine-formaldehyde precondensate dissolved in the acid aqueous medium, a complex would appear to form, which is water-soluble and brings about the desired stabilization of the oil-in-water dispersion. The water-soluble, anionic, sulphonated melamine-formaldehyde precondensate is preferably in a definite excess compared with its interacting reactant. Thus, it is possible to conclude that the stabilizing complex has an anionic character or the sum of the interactions acts anionically. The water-soluble, anionic, sulphonated melamine-formaldehyde precondensate alone does not have the stabilizing action. The solubility of the stabilizing complex is to a certain extent dependent on the concentration and pH-conditions of the medium and on the chemical structure of the cationic/cationized molecule. However, it has been found that a turbidity or precipitation is not prejudicial to emulsion or dispersion stabilization.

The particular advantages of the process according to the invention are that it no longer requires the use of film-forming, water-soluble polymers, which e.g. lead to capsule agglomerates on spray drying the capsule dispersion and which impair the typing quality of microcapsule carbon papers. This does not apply with regards to the microcapsules obtained according to the invention. As a specific water-soluble polymer can be excluded, there can be a free choice of the binder necessary for forming the capsule coating on the carrier paper. Finally, in a special development of the inventive process, in which in a subsequent process stage only the anionic, sulphonated melamine-formaldehyde precondensate is added, it is possible to control, namely reduce the viscosity. This makes it possible to clearly increase the oil fraction, and therefore the active substance fraction in the reaction system, and therefore also the yield of microcapsules per volume unit. Thus, more active microcapsule material can be formed per unit of time in a plant. In addition, the water-soluble, anionic, sulphonated melamine-formaldehyde precondensate is a commercially available, inexpensive product.

Compared with the aforementioned, known processes, the inventive process also offers apparatus advantages. Thus, in a preferred embodiment at the start of the process there is no need for a high power dispersing apparatus, which is only needed for producing the emulsion. As the inventive process permits the obtaining of high quality, dry single capsules, they can be introduced into the most varied media, so that they can be applied therewith to suitable carriers, which opens up new fields of use. The prior art processes based on the use of water-soluble polymers, exclude such possible uses, because agglomerate formation occurs when isolated the capsules.

As a result of the fact that the inventive microcapsules are essentially single capsules and therefore the disadvantageous agglomerates are substantially excluded, following redispersion in advantageous solvents (such as aliphatic $C_1$ to $C_4$-alcohols, cycloaliphatic, paraffinic and isoparaffinic hydrocarbons, halogenated hydrocarbons, lower alkyl ethers and esters), they are in case of encapsulated colour reactants particularly good for troublefree printing (no swelling, improved type quality), particularly for segmental printing, e.g. in flexographic, screen and intaglio printing processes. Thus, capsule application only takes place at the points where subsequently carbon transfer processes occur. The choice of the optimum solvent is dependent on the printing process used. Much the same applies regarding the production of offset and hot melt printing inks. Independently of the nature of the abovedescribed, non-aqueous printing system, the inventively obtained microcapsules are always dispersible therein as single capsules. Apart from the indicated cost advantage of spot printing processes compared with whole-area coating or whole-surface printing, the printer is provided with the possibility of being able to individualize a set of forms. Apart from commercial considerations, importance is also attached to the question of the esthetic design and the usability of the most varied carrier materials.

The invention is described in greater detail hereinafter relative to the following examples.

EXAMPLE 1

10% by weight of a 20% aqueous solution of a sulphonated melamine-formaldehyde precondensate is diluted with 30 parts by weight of water at approximately 22° C. Accompanied by stirring with a normal blade mixer or stirrer, 6.7 g of an aqueous solution of a cationized melamine-formaldehyde precondensate is added and which was obtained by dissolving 0.5 g of Resin 42–05 in a mixture of 6 g of water and 0.2 g of 85% formic acid. To this solution is added, accompanied by stirring with a high power dispersing apparatus and at approximately 22° C., 27.2 g of an oily phase at 45° C., which is obtained by dissolving 1.1% by weight of 1,3-dimethyl-6-diethylaminofluoran, 0.4% by weight of crystal violet lactone, 0.2% by weight of 3,3-bis-(1'-n-octyl-2'-methyl-indol-3'yl)phthalide, 2.4% by weight of 2-octylamino-6-diethylaminofluoran, 0.3% by weight of 9-N-butyl-carbazolyl(3)-4',4''-bis-(N-methyl-N-phenylamino)-diphenyl methane and 0.6% by weight of 10-benzoyl-3,7-bis-(diemthylamino)phenothiazine in diisopropyl naphthalene. The resulting stable emulsion at approximately 40° C. is mixed, accompanied by further stirring with a normal blade stirrer, with a solution of 3 g of water and 1 g of 85% formic acid, a pH-value of approximately 3.6 being set. The thus set acid, stable emulsion is mixed under constant stirring with a wall forming solution of 12 g of Resin 42–91 (60% solution of a methylated melamine-formaldehyde precondensate in water) and 5 g of water and then, also accompanied by stirring, is heated to 55° C and stirred at this temperature for 4 hours. After cooling to ambient temperature and setting the pH-value to 8.8 by means of 25% ammonia water, a capsule dispersion is obtained, whose capsules have a diameter of approximately 3 to 8 micrometers and a dry weight of approximately 38% by weight.

The dispersion obtained is eminently suitable for use in the production of colour reaction paper. It is necessary to add binders, because this capsule dispersion has no binding or adhering capacity with respect to the substrate. The binders can be freely chosen from the extensive range of water-soluble colloids (starch and derivatives, cellulose derivatives, acrylates, etc.), or the equally broad product range of synthetic resin latexes.

Unlike conventional aqueous capsule dispersions, when dried to glass, metal or paper substrates, the capsule dispersion does not provide a cohesive film and instead decomposes when even a slight force is applied, the draught of a fan being enough so as to give capsule dust, which essentially comprises individual capsules. It is obvious that such a capsule dispersion is very suitable for spray drying. Through the presence of individual capsules, it is very easy to subsequently redisperse the capsule dust in the most varied media. If this capsule dust is redispersed in alcohol, then the diameter distribution shown in FIG. 2b is obtained and is virtually congruent with the diameter distribution of the previously described aqueous dispersion, which is apparent by comparison with the distribution according to FIG. 2a. Such alcohol-redispersed microcapsules can be used in segmental printing for the production of form sets by the printer and provide a better type quality than the known products. The individual capsule material redispersed in non-aqueous systems in the described way can be used with particular advantage for producing so-called SC-papers (self contained papers).

EXAMPLE 2

To a solution at ambient temperature prepared by mixing 211.5 g of water and 88.8 g of a 20% aqueous solution of a sulphonated melamine-formaldehyde precondensate is added under gentle stirring with a blade stirrer 56 g of a cationized melamine-formaldehyde precondensate solution, which is also at ambient temperature. The latter solution is obtained by dissolving 3.5 g Resin Madurit MW 150, 51.2 g of water and 1.4 g of 85% formic acid. This leads to an anionic solution, which leaves behind no sediment on centrifuging at 10,000 rpm and which can be filtered without residue by a blue band filter. Accompanied by stirring with a high power dispersing apparatus, 417.3 g of an oil phase is added to this solution at approximately 42° C., which consists of 156.5 g of chlorinated paraffin, 252 g of kerosine and 8.8 g of colour couplers. The color couplers were constituted by a mixture of 75% crystal violet lactone and 25% of 9-N-butyl-carbazolyl-(3)-4',4''-bis-(N-methyl-N-phenyl-amino)-diphenyl methane.

The emulsion which forms has a droplet diameter of approximately 3 to 10 micrometers, to which there is no significant change during the further process stage.

By adding 33.5 g of 20% aqueous formic acid under gentle stirring, the system is set to an acid pH-value of approximately 3.4, and subsequently 131 g of a melamine-formaldehyde precondensate resin solution formed from 80 g Urecoll SMV and 51 g of water is added.

After heating the emulsion to 58° C. and maintaining the temperature for 3.5 hours under gentle stirring, a capsule dispersion formed which, after cooling and neutralizing by means of 25% ammonia water to a pH-value of 8, gave capsules with a diameter of approximately 3 to 10 micrometers and the same characteristics as described in Example 1. These include: no adhesion to substrates of different types, no restriction as regards the choice of binder, individual capsules on spray drying or allowing the dispersion to dry, stable capsules, very suitable for the production of colour reaction paper coating materials, etc. The dry substance content of the dispersion is approximately 47% by weight, whilst the viscosity was only 14 FB$_4$ seconds. Measured on the high active substance fraction of the dispersion, this value is extremely low.

EXAMPLE 3

84 g of a 20% solution of a sulphonate melamine-formaldehyde precondensate was diluted with 250 g of water and accompanied by stirring. 55 g of an aqueous solution, formed from 40 g of water and 15 g of a 20% solution of a cationized, modified polyethylene imine was added at ambient temperature.

Using a high power dispersing apparatus, 197 g of an oil was emulsified at ambient temperature and which consisted of 90% of a neutral, low-odor, low-viscosity (approx. 30 mPas), water-insoluble carrier oil and 10% of a synthetic, oily perfume smelling of rose petals. The emulsion had a droplet diameter of approximately 3 to 12 microns and remained stable throughout the further process stages.

By adding 31 g of 20% formic acid to the emulsion, accompanied by stirring using a blade stirrer, with further addition of a solution of 50 g of water and 55 g of a 70% solution of a methylolated melamine-formaldehyde precondensate, and with subsequent heating to 55° C. for 4 hours, a capsule dispersion formed. By cooling and adding 25% ammonia solution, a pH-value of 7.5 was set and subsequently 7 g of ethylene urea was added. After stirring for 1 hour, the pH-value dropped to below 7 and was again adjusted to 7 with ammonia water.

The capsule dispersion could be spray dried to a very loose, extremely fine-powdered material. On triturating the capsule powder, there was instantaneously an intense odor of fresh rose petals.

COMPARISON EXAMPLE 1

Example 1 was repeated, but without using the cationized melamine-formaldehyde precondensate solution. Immediately following the end of stirring with the high power dispersing apparatus, the emulsion collapsed. The oil in part collected in pools on the liquid surface and it was not possible to produce capsules.

COMPARISON EXAMPLE 2

Example 2 was repeated, but without adding the cationized melamine-formaldehyde precondensate solution. As described in comparison example 1, no usable capsules could be produced.

COMPARISON EXAMPLE 3

Example 3 was repeated without adding the cationized polyethylene imine solution. As explained in comparison examples 1 and 2, no capsules could be produced, because here again the oil emulsion was not sufficiently stable.

We claim:

1. A process for microencapsulating hydrophobic oils within discrete aminoplastic microcapsules, comprising the steps of:
   combining a hydrophobic oil, a cationic compound, and an anionic sulphonated melamine/formaldehyde precondensate in an aqueous medium, wherein the oil is added under turbulent stirring conditions, to form a stable dispersion of said oil in said medium,
   acidifying said aqueous medium,
   contacting an aminoplastic wall-forming compound with the dispersed oil of said acidified medium, under laminar stirring conditions, to form said microcapsules.

2. A process according to claim 1, wherein said sulphonated melamine/formaldehyde precondensate has an average of approximately 0.7 to 1.3 sulphonate groups per melamine ring.

3. A process according to claim 2, wherein said sulphonated melamine-formaldehyde precondensate has an average approximately 2 to 4 methylol groups per melamine ring.

4. A process according to claim 1, wherein said sulphonated melamine/formaldehyde precondensate has an average of approximately 2 to 4 methylol groups per melamine ring.

5. A process according to claim 1, wherein said sulphonated melamine/formaldehyde precondensate is water-soluble, and has a molecular weight of approximately 3,000 to 300,000.

6. A process according to claim 5, wherein said sulphonated melamine/formaldehyde precondensate is water-soluble, has a molecular weight of approximately 5,000 to 100,000, and is present in excess with respect to said cationic compound.

7. A process according to claim 1, wherein said sulphonated melamine-formaldehyde precondensate is present in the aqueous medium in a quantity of approximately 0.3 to 25% by weight.

8. A process according to claim 1, wherein there are approximately 0.02 to 5 parts by weight of said cationic compound per approximately 1 part by weight of said sulphonated melamine/formaldehyde precondensate.

9. A process according to claim 1, wherein said cationic compound is a water-insoluble cationic melamine-formaldehyde precondensate that is water-soluble in the presence of said anionic sulphonated melamine/formaldehyde precondensate.

10. A process according to claim 9, wherein said cationic melamine-formaldehyde precondensate comprises an oligomer having 2 to 6 triazine rings and 2.5 to 5 methylol groups per triazine ring, and which is substantially free of methylol ether groups.

11. A process according to claim 10, wherein said nonionic melamine-formaldehyde precondensate is partly etherified with methanol.

12. A process according to claim 1, wherein said wall-forming compound is a water-soluble, nonionic melamine-formaldehyde precondensate.

13. A process according to claim 12, wherein the concentration of said nonionic melamine/formaldehyde precondensate in said aqueous medium is from about 7 to 20% by weight.

14. A process according to claim 1, wherein said wall-forming compound is a urea/formaldehyde precondensate.

15. A process according to claim 1, wherein said wall-forming compound is selected from the group consisting of melamine-formaldehyde precondensates, urea-formaldehyde precondensate, aldehyde precondensates based on thiourea, N-alkyl urea, guanidine, acetoguanamine, benzoguanamine, caprinoguanamine, cyanamide, dicyandiamide, alkyl/aryl sulphonamide, and mixtures thereof.

16. A process according to claim 1, wherein the viscosity of the aqueous medium is selectively reduced by the addition of increasing amounts of said sulphonated melamine/formaldehyde precondensate.

17. A process according to claim 1, wherein said hydrophobic oil contains a core material selected from the group consisting of color reactants of color reaction systems, perfumes and aromatizing agents, flavoring agents, vitamins, fertilizers, insecticides, insect attractants, fungicides, plant protection agents, cleaning agents, solvents, lubricants, luminous paints, liquid crystals, adhesives for single or multi-component systems, paint pigment dispersions, and magnetic pigment dispersions.

18. A process according to claim 1, wherein said cationic compound and said sulphonated melamine/formaldehyde precondensate together comprise a water-soluble dispersion-stabilizing complex.

19. A process according to claim 1, comprising the additional step of isolating said microcapsules from said aqueous medium.

20. A process according to claim 19, wherein said isolating step is at least one of centrifuging, filtering, evaporating, flushing or spray-drying said microcapsules from said aqueous medium.

21. A process according to claim 19, comprising the additional step of redispersing said isolating microcapsules in a liquid carrier.

22. A process according to claim 21, wherein said liquid carrier is non-aqueous.

23. A process according to claim 21, wherein said liquid carrier is at least one of aliphatic alcohols having 1 to 4 carbon atoms, cycloaliphatic, paraffinic and isoparaffinic hydrocarbons, lower alkyl ethers, and lower alkyl esters.

24. A process according to claim 1, wherein the acidified oil-in-water dispersion has a pH of from about 3 to 6.

25. A process according to claim 1, wherein said contacting step takes about 1 to 5 hours.

26. A process according to claim 1, wherein said contacting step is performed at a temperature of about 55° C.

27. A process according to claim 1, wherein said contacting step is performed in the presence of an ammonium salt catalyst.

28. A process according to claim 1, wherein said contacting step is selectively terminated by adjusting the pH to at least 7.

29. A process according to claim 1, comprising the additional step of adding a binder selected from the group consisting of a water-soluble colloid and a synthetic resin latex.

30. A process according to claim 1, wherein said sulphonated melamine/formaldehyde precondensate has the formula:

wherein n is an integer between 8 and 1000.

31. A process according to claim 30, wherein n is from 15 to 350.

32. A process according to claim 1, wherein said cationic compound is selected from the group consisting of cationic polyethylene imines, polyamidoamines, polyether amines, polyamidine-epichlorhydrins, dicyanamide/formaldehyde complexes, modified alkylaryl polyglycol ether, fatty acid amide condensation products, amine-amide formaldehyde condensation products, dicyandiamide derivatives, immidazoline derivatives, aminocarboxylates, quaternary ester ammonium compounds, cationic melamine-formaldehyde precondensates, aldehyde precondensates based on thiourea, N-alkyl urea, guanidine, guanamine derivatives, quanamides, alkyl/aryl sulphonamides, and mixtures thereof.

33. A process according to claim 1, wherein said hydrophobic oil is selected from the group consisting of partially hydrogenated terphenyls, chlorinated paraffins, alkylated biphenyls, alkyl naphthalenes, diaryl methane derivatives, dibenzyl benzene derivatives, alkanes, cycloalkanes, phthalate esters, adipate esters, trimetallate esters, phosphate esters, and silicone oils.

34. A process for microencapsulating hydrophobic oils within discrete aminoplastic microcapsules, comprising the steps of:

providing an aqueous medium of a water-insoluble, cationic compound and a water-soluble, anionic, sulphonated melamine/formaldehyde precondensate, said sulphonate melamine/formaldehyde precondensate having an average per melamine ring of about 0.7 to 1.3 sulphonate groups and about 2 to 4 methylol groups, combining a hydrophobic oil with said aqueous medium, under turbulent stirring conditions, to form a stable oil-in-water dispersion of said oil in said medium, acidifying said aqueous medium, contacting an aminoplastic wall-forming compound with the dispersed oil of said acidified medium, under laminar stirring conditions, to form said microcapsules, isolating said microcapsules from said aqueous medium, and redispersing said microcapsules in a non-aqueous liquid carrier.

35. A process according to claim 34, wherein said sulphonated melamine/formaldehyde precondensate has the formula:

wherein n is an integer between 15 and 350.

36. A process according to claim 34, wherein said cationic compound is selected from the group consisting of cationic polyethylene imines, polyamidoamines, polyether amines, polyamidine-epichlorhydrins, dicyanamide/formaldehyde complexes, modified alkylaryl polyglycol ether, fatty acid amide condensation products, amine-amide formaldehyde condensation products, dicyandiamide derivatives, immidazoline derivatives, aminocarboxylates, quaternary ester ammonium compounds, cationic melamine-formaldehyde precondensates, aldehyde precondensates based on thiourea, N-alkyl urea, guanidine, guanamine derivatives, quanamides, alkyl/aryl sulphonamides, and mixtures thereof.

37. A process according to claim 34, wherein said hydrophobic oil is selected from the group consisting of partially hydrogenated terphenyls, chlorinated paraffins, alkylated biphenyls, alkyl naphthalenes, diaryl methane derivatives, dibenzyl benzene derivatives, alkanes, cycloalkanes, phthalate esters, adipate esters, trimetallate esters, phosphate esters, and silicone oils.

* * * * *